C. C. RUNNER.
MOTOR CONTROL.
APPLICATION FILED JAN. 2, 1917.
1,320,927.
Patented Nov. 4, 1919.
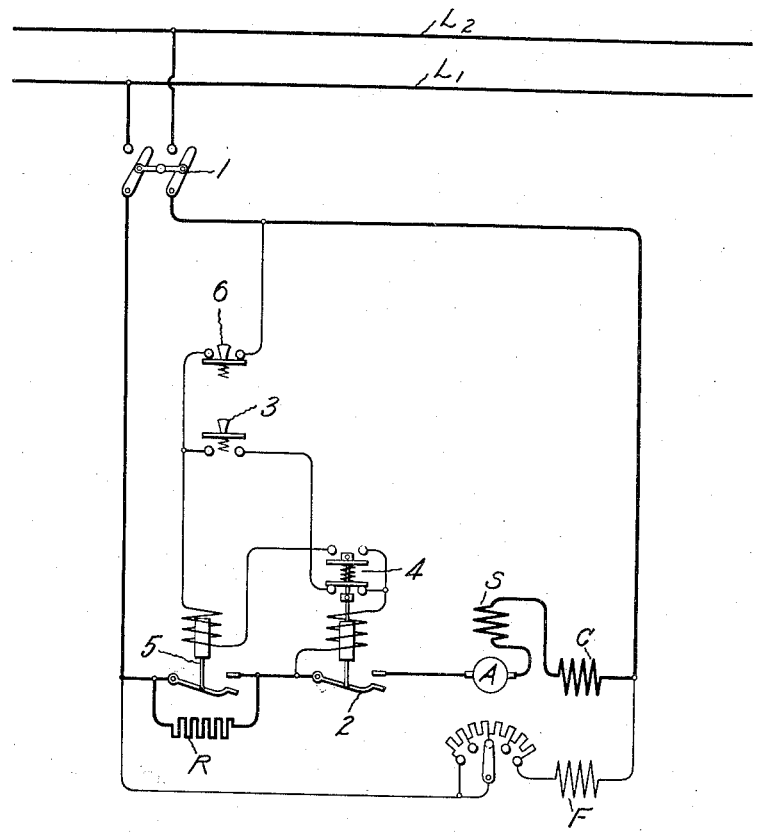
Inventor:
Claude C. Runner,
by Albert G. Davis
His Attorney.

UNITED STATES PATENT OFFICE.

CLAUDE C. RUNNER, OF SCHENECTADY, NEW YORK, ASSIGNOR TO GENERAL ELECTRIC COMPANY, A CORPORATION OF NEW YORK.

MOTOR CONTROL.

1,320,927.     Specification of Letters Patent.     Patented Nov. 4, 1919.

Application filed January 2, 1917. Serial No. 139,997.

*To all whom it may concern:*

Be it known that I, CLAUDE C. RUNNER, a citizen of the United States, residing at Schenectady, in the county of Schenectady, State of New York, have invented certain new and useful Improvements in Motor Controls, of which the following is a specification.

My invention relates to the control of electric motors and it provides improved means whereby they may be started and stopped and generally controlled in a safe, reliable, and efficient manner.

More specifically my invention relates to the control of an electric motor by means of push buttons or the like located at a distance from the motor to be controlled, the motor circuits themselves being controlled by means of electromagnetic switches which have their coils energized through a circuit or circuits in shunt to the motor. Such electromagnetic switches are ordinarily termed shunt contactors to distinguish them from the series contactors which have their operating coils directly in the motor circuit. In an application of John Eaton, Serial No. 140,117, filed January 2, 1917, and assigned to the same assignee as this application, there is described and claimed an electric motor control having an electromagnetic line switch and an electromagnetic accelerating switch which is arranged to close responsively to the speed of the motor, the coils of the switches being connected in series in a shunt circuit to the motor armature. These switches are controlled by a master switch and the arrangement is such that when the line switch is caused to close by the operation of the master switch, the operation of the accelerating switch is controlled by the master switch. For certain installations it is not desirable that the accelerating switch be controlled in this manner, it being preferable that after the line switch is caused to close by the operation of the master switch, the coils of the line switch and the accelerating switch shall be connected in series in a shunt circuit to the motor armature and the accelerating switch energized to close responsively to the speed of the motor through a circuit independent of control by the master switch. My arrangement is designed for use in such installations.

In carrying out my invention, I provide a starting push button for energizing the coil of the electromagnetic line switch to close the switch and connect the motor to a source of supply through a starting resistance, the arrangement being such that this electromagnetic line switch in closing connects its own coil in series with the coil of the electromagnetic accelerating switch in a shunt circuit to the motor armature independently of the circuit through the push button, thereby maintaining the line switch closed with a reduced current in its coil circuit to prevent overheating and energizing the electromagnetic accelerating switch to close responsively to the voltage of the motor armature to cut out the starting resistance when the motor has reached the predetermined speed at which it is desired the starting resistance be cut out of the motor circuit. As soon as the line switch closes, the starting push button is inoperative to effect any further control of the motor until the line switch drops open, but the motor may be stopped by pressing another push button, called the "stop" button. My arrangement is simple in construction, inexpensive to manufacture and devoid of many of the complications of existing controls.

Referring to the drawing, the single figure of which shows an embodiment of my inventon, the electric motor having an armature A, a shunt field F, a series field S, and a commutating field C, is adapted to be energized from the source of supply $L_1 L_2$ when the main switch 1 is closed, by means of the electromagnetic line switch 2, when the starting push button 3 is depressed. The motor armature circuit is thus completed through the starting resistance R. The electromagnetic line switch 2 has an auxiliary switch or interlock 4 which connects the coils of the line switch 2 and the electromagnetic accelerating switch 5 in series in a shunt circuit to the motor armature, at the same time opening the circuit through the push button 3 and rendering this push button ineffective to further control the line switch until the line switch is deënergized and drops its contacts. With the line switch closed, the coils of both switches are energized responsively to the voltage of the motor armature, the current in the coil of the line switch is reduced to prevent its overheating and the accelerating switch 5 is energized to close automatically when the speed of the motor has reached the predetermined value at which it is desired the starting resistance R shall be cut out of the motor armature circuit and the motor accelerated to full running speed. The motor may be at any time stopped by depressing the stop push button 6, thereby deenergizing the coils of the line switch and the accelerating switch, causing these switches to drop their contacts and disconnect the motor armature circuit from the source of supply.

It will be assumed that the motor is at rest with all the switches except the stop push button 6 open, as shown in the drawing, and that it is desired to start the motor. The operation is as follows: Closing the main switch 1 connects the shunt field F directly across the source of supply preparatory to starting the motor. To start the motor, the push button 3 is depressed, thereby energizing the coil of the electromagnetic line switch 2 from the supply conductor $L_1$, through the starting resistance R, lower contact of interlock 4, starting push button 3, stop push button 6 to the other supply conductor $L_2$. The electromagnetic line switch will be energized to close and connect the motor armature to the source of supply through a circuit including the starting resistance R. The line switch in closing lifts the interlock 4 until the upper contact of the interlock makes engagement with its corresponding set of stationary contacts, and almost immediately thereafter the lower contact of this interlock opens, thereby opening the circuit through the starting push button 3. The upper contact of the interlock 4 connects the coils of the line switch and the accelerating switch in series in a shunt circuit to the motor armature, thereby reducing the current in the coil of the line switch and energizing the accelerating switch to close responsively to the voltage of the motor armature when the speed of the motor has increased to the predetermined value at which it is desired that the starting resistance R be short circuited and the motor accelerated to full running speed. The starting push button 3 has now been rendered inoperative to effect any further control of the switches until the line switch has been deënergized and drops its contacts. The motor may be stopped by pressing the push button 6, thereby opening the circuit in which the coils of the line switch and the accelerating switch are included. These switches will then drop out and disconnect the motor armature circuit from the source of supply. When the line switch 2 opens, the upper contact of interlock 4 is dropped out of engagement with its set of contacts and the lower contact of this interlock makes engagement with its set of contacts, thereby breaking the circuit connection between the coils of the two switches and rendering the starting push button 3 effective to again start the motor when desired.

While I have described a specific embodiment of my invention, it should be understood that I do not limit my invention thereto, since various modifications may be made therein without departing from the spirit of my invention, the scope of which is set forth in the claims which are hereto annexed.

What I claim as new and desire to secure by Letters Patent of the United States, is:—

1. The combination with an electric motor of two electromagnetic switches, one for connecting the motor to the line and the other for accelerating the same, a push button for closing the line switch, and means whereby the line switch in closing connects the coils of said switches in a circuit independent of the push button and energized responsively to the speed of the motor.

2. The combination with an electric motor of two electromagnetic switches, one for connecting the motor to line and the other for accelerating the same, a push button for controlling said switches, and means whereby the line switch in closing connects its coil in series with the coil of the accelerating switch in a shunt circuit to the motor armature and opens the circuit through the push button, thereby maintaining the line switch closed with a reduced current in its coil circuit and energizing the accelerating switch to close responsively to the voltage of the motor armature through a circuit independent of the push button.

3. The combination with an electric motor and a source of supply therefor, of a starting resistance and two electromagnetic switches, one for connecting the motor to the source of supply and the other for cutting out the starting resistance, a push button for closing the line switch and connecting the motor to the source of supply through a circuit including the starting resistance, and a switch operated by the line switch in closing to connect the coils of said switches in series in a shunt to the motor armature through a circuit independent of the push button, thereby maintaining the line switch closed with a reduced current in its coil circuit and energizing the accelerating switch to close responsively to the voltage of the motor armature through a circuit independent of control by the push button.

In witness whereof, I have hereunto set my hand this 29th day of December, 1916.

CLAUDE C. RUNNER.